April 30, 1963 R. D. HORBINSKI ET AL 3,087,338
DEPTH AND TEMPERATURE INDICATOR
Filed March 3, 1960 2 Sheets-Sheet 1
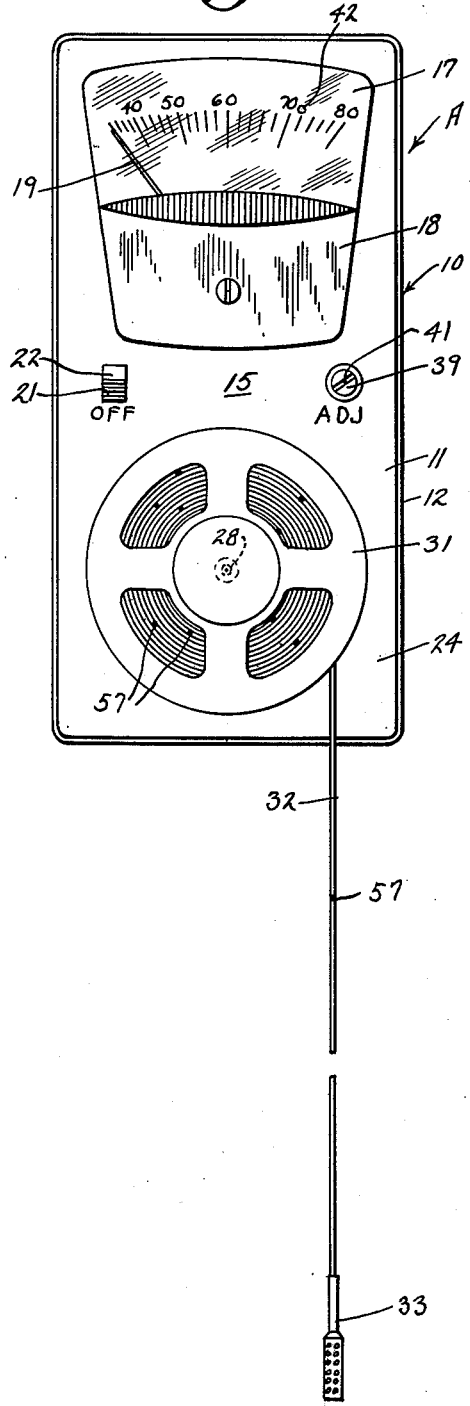
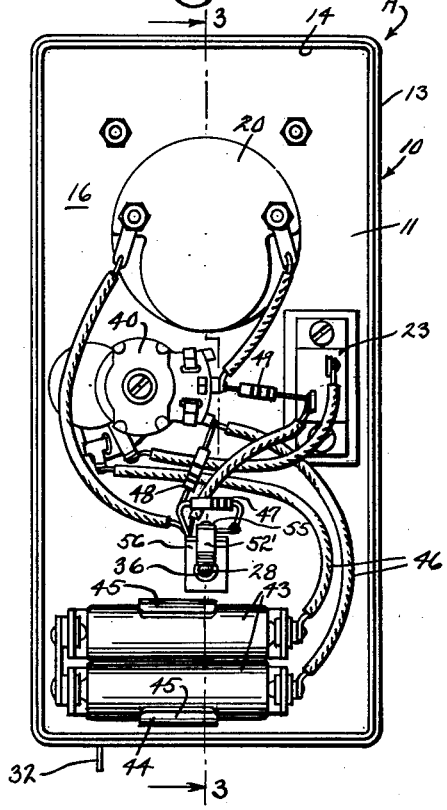
INVENTORS
RICHARD D. HORBINSKI
RODERICK DHU MAC GREGOR
MICHAEL R. NEUMAN
BY
*Wright and Wright*
ATTORNEYS April 30, 1963 R. D. HORBINSKI ET AL 3,087,338
DEPTH AND TEMPERATURE INDICATOR
Filed March 3, 1960 2 Sheets-Sheet 2

INVENTORS
RICHARD D. HORBINSKI
RODERICK DHU MAC GREGOR
MICHAEL R. NEUMAN
BY *Wright and Wright*
ATTORNEYS

United States Patent Office 3,087,338
Patented Apr. 30, 1963

3,087,338
DEPTH AND TEMPERATURE INDICATOR
Richard D. Horbinski, Roderick Dhu MacGregor, and Michael R. Neuman, all of Milwaukee, Wis., assignors to Thermo Products Company, Inc., Milwaukee, Wis., a corporation
Filed Mar. 3, 1960, Ser. No. 12,621
1 Claim. (Cl. 73—362)

This invention appertains to indicators, and more particularly to a temperature indicating device to be utilized by fishermen for ascertaining the temperature of the water at various depths. According to experts in the field of fishing, and certain conservation departments, fish are found at particular depths, according to the temperature of that depth. For example, lake trout are found at a temperature of 41 degrees, while pan fish are found anywhere from temperatures of 68 to 74 degrees; northern and pickerel at 72 degrees, etc. Each particular game fish prefers a certain temperature. The water itself is divided into three main layers, a top layer called epilimnion, where there is best fishing and adequate oxygen but where the temperature fluctuates at given depths; a middle layer called thermocline where there is a rapid change in temperatures and where good fishing is found near the top, and then the bottom layer called hypolimnion, which is always 40 degrees F., having little oxygen and poor fiishing.

Fishermen have long known that fish do prefer certain temperatures, and some fishermen merely lower a thermometer into the water marking off the line in feet, allowing the thermometer to stay at a given point for a while, then pulling the thermometer from the water and taking a reading. Obviously, this is a slow and inaccurate method of taking water temperatures.

It is therefore a primary object of the present invention to provide a device having a hand held indicator and a weighted probe which is lowered into the water, and which will immediately and quickly indicate the temperature of the water at any given level.

Another important object of my present invention is to provide an instrument which may be held in the hand and which may operate from the voltage found in the ordinary penlight type batteries.

A still further object of my present invention is to provide means by which the instrument may be quickly calibrated to adjust for any voltage change due to the aging of the battery and which when so calibrated will accurately indicate the temperature of the water at the probe level.

A more specific object of my present invention is to provide a thermistor in this probe which is a temperature sensitive resistor having a high negative temperature coefficient of resistance. The resistance of the termistor is in other words, a function of its temperature.

A still further object of my present invention is to provide a simple circuit of the Wheatstone bridge type, so that the resistance of the thermisto is measured by the unbalanced Wheatstone bridge, and hence the Wheatstone bridge indirectly measures the temperature by providing an 0–1 milliampere meter, with a special scale calibrated in degrees Fahrenheit.

A salient feature of my present invention is to provide an instrument for measuring the temperature of the water at various levels in which the circuit is provided with an "On" and "Off" button to conserve the battery voltage when not in use, and also having means to remove the thermistor probe from the circuit when it is desired to calibrate and adjust the meter for the given voltage.

A further object of my invention is to provide a simple, practical and reliable construction that is economical to manufacture and easy to assemble and positive in its operation.

With the above and other objects in view which will more readily appear as the nature of the invention is better understood, the same consists in the novel construction, combination and arrangement of parts, hereinafter more fully described, illustrated and claimed.

One preferred and practical embodiment of my present invention is shown in the accompanying drawings, in which FIGURE 1 is a top plan view of my novel instrument, showing in particular the intermediate section with the cover section removed;

FIGURE 2 is a bottom plan view of the intermediate section illustrating in particular the novel arrangement of the penlight batteries, resistors and adjustable potentiometer and meter;

Figure 3:
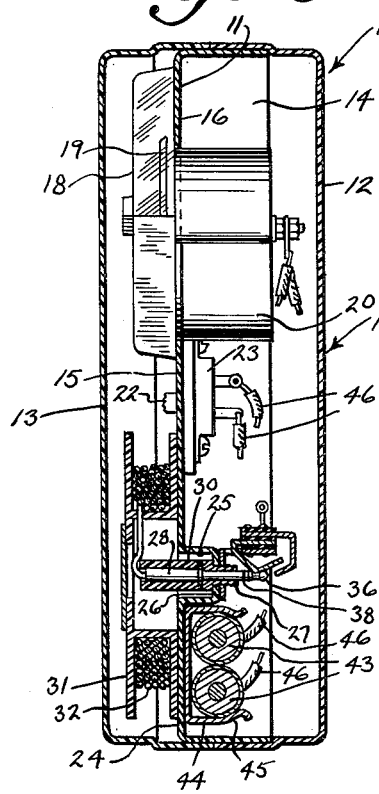
FIGURE 3 is a longitudinal section taken through the device with the cover and bottom sections secured in proper place with the intermediate base section, the section being represented by the line 3—3 of FIGURE 2, looking in the direction of the arrows.

Now referring to the drawings in detail, wherein similar reference characters designate corresponding parts throughout the several views, the letter A generally indicates one type of my novel, improved indicator and the same includes broadly, a casing 10 having an intermediate base section 11, a bottom 12 and a top cover 13. The intermediate base section 11 carries the working parts of my novel device and the bottom section 12 and top cover section 13 are formed identically, and are received over the peripheral flange 14 of the intermediate base section 11. Thus, when the device is not in use, the working parts are completely covered and are protected from damage thereto.

Figure 4:
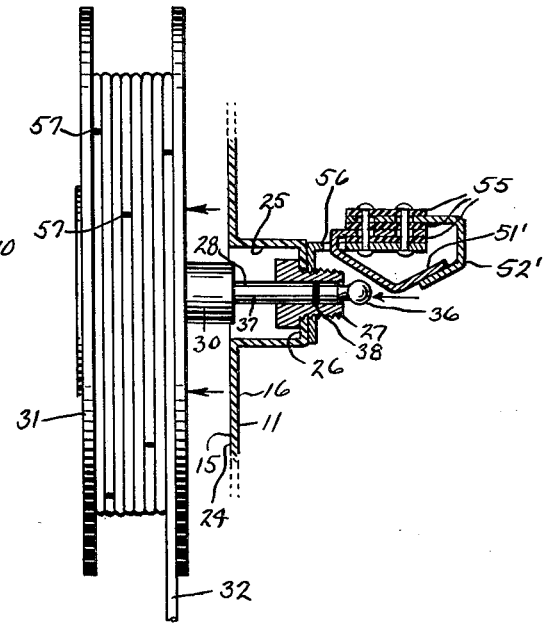
FIGURE 4 is an enlarged fragmentary view partly in section illustrating further details in the means for removing the thermistor proble and wire from the circuit.

Referring now to the intermediate section 11 and to FIGURES 1 and 2 of the drawings, it can be seen that this base section 11 has a top surface 15 and an under surface 16. The top surface 15 carries the indicating face 17 of a 0–1 milliampere meter and the same is specially calibrated in degrees Fahrenheit, as shown. This meter 18 is of a standard type available on the market, and carries a pointer 19 which is responsive to changes in the flow of current through resistors in an unbalanced Wheatstone bridge. This indicator is provided with a circular casing 20 and this circular casing 20 is received in an aperture formed in the top wall 15, so that it extends through to the under surface 16 of the intermediate section 11. This upper wall 15 of the intermediate section also is slotted at 21 to receive the "On" and "Off" button 22 of the switch 23. Further, one end 24 of the upper wall 15 has formed centrally therein a well or depression 25, the lower wall 26 of which carries a fitting 27 to receive the jack 28. This jack 28 is in turn secured to the hub 30 of a reel 31 and this reel carries a length of flexible wire 32 thereon. This wire 32 is marked off in feet and carries the weighted probe end 33. This probe end is of a standard thermistor type as explained above and is actually a temperature sensitive resistor and is indicated by the numeral 33 in the wiring diagram shown in FIGURE 5 of the drawings. As shown in the wiring diagram, this probe 33 actually consists of two lead wires 34 and 35 and one is connected to the end 36 of the jack, and the other is connected to the stem 37 of the jack and these are further insulated one from the other by the insulating strip 38. Further the upper surface is provided with a slotted head adjustment 39 which is utilized to vary the resistance capacity of the 500 ohms linear control indicated by the numeral 40 in the circuit diagram, and by the same numeral 40 in FIGURES 2 and 3 of the drawings. This resistance is adjusted by means of a screw driver which is merely inserted in the slot 41, as indicated and is done when the reel is removed from the circuits, as indicated in FIGURE 4. With the switch in the "On" position the pointer 19 is then adjusted to a predetermined spot, indicated by the numeral 42 of the drawings, and from which spot an accurate measurement of a change in resistance in the thermistor 33 can be seen. Obviously, for the purpose of indicating temperature, the face is then calibrated as previously stated in degrees Fahrenheit.

Thus it can be seen from the description so far, that my device can be adjusted to give a very accurate indication of the temperature of the water at the point where the probe 33 is located.

Figure 5:
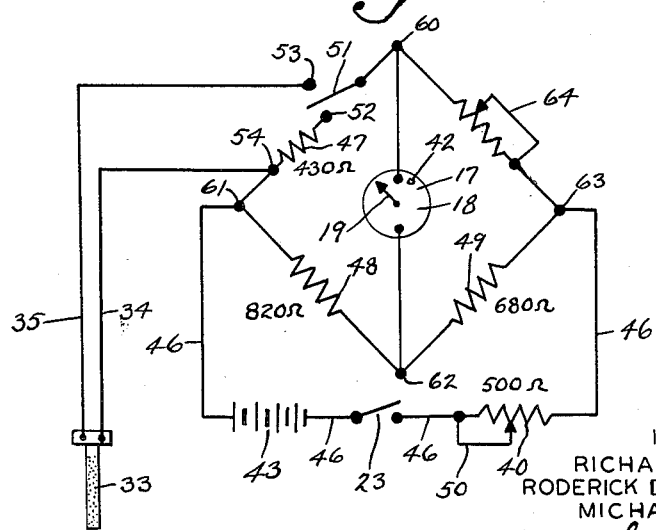
FIGURE 5 is a wiring diagram illustrating one desired circuit.

Referring now to the wiring diagram in FIGURE 5, it can be seen that the principle involved is merely of the Wheatstone bridge type, and the measurement is actually a measure of resistance through the thermistor by the unbalanced Wheatstone bridge. The source of power indicated by the numeral 43, is of course, the penlight batteries which are also indicated by the numeral 43 and shown in particular in FIGURES 2 and 3 of the drawings, and are held to the under wall surface 16 of the intermediate section 11 by means of a bracket clip 44, the fingers 45 of which can partly encircle the batteries. The batteries are connected by means of wires 46 through the "On" and "Off" switch 23 to the adjustable linear control 40.

It might be well to here point out that for better understanding similar reference numerals have been utilized on the wiring diagram to indicate corresponding parts in FIGURES 1 to 4, inclusive.

For example tht known value resistors are indicated in both instances by the numerals 47, 48 and 49 respectively, and for a better understanding of the exact means for measuring the temperature of the water through the probe 33, attention is directed to the wiring diagram of FIGURE 5. As previously brought out, the thermistor or probe 33 is actually a temperature sensitive resistor and gives a different resistance depending on the temperature of the water and this, in turn, is transmitted by the pointer 19 of the meter 18 across the face of the dial, which for the above purposes is calibrated in degrees Fahrenheit. Now, inasmuch as the source of power 43 is by means of the penlight batteries naturally this voltage will vary as the batteries age, and therefore, the voltage in the system has a tendency to vary, and there must be some reference point to which the pointer can be adjusted to a known unbalance of the bridge regardless of the amount of voltage given from batteries 43, and then, of course, any variance in the resistance 33, i.e., the probe, can be accurately measured. Therefore, I provide a variable resistor 40 which adjusts and compensates for the variance of the battery voltage with the bridge at a known unbalance and this adjustment is made until the pointer is at the indicated spot 42. The amount of resistance given to the current is adjustable by merely inserting a screw driver in the slot 41, and this, of course, varies or slides the shunt, indicated as 50 on the wiring diagram. This is done with the switch 23 closed and the lead 51 in contact with the contact point 52 so that the probe 33 is not in the circuit. Then the pointer 19 can be adjusted to its reference point 42 from which it will always accurately determine the temperature resistance regardless of the voltage in 43. In actual practice this adjustment does not have to be made too often and seldom during the same fishing trip. Now, when the resistance through the thermistor 33 is to be measured, lead 51 must be moved to contact point 53 and then the thermistor 33 is in circuit through wires 34 and 35 and any change in the resistance 33 will immediately be reflected by the pointer 19. This lead 51 of the wiring diagram in its practical use is the spring finger 51' and the finger 52' corresponds to the contact point 52 of the wiring diagram. The rounded end termination 36 of the jack would of course correspond to contact 53 and the stem 37 thereof would correspond to contact point 54 of the wiring diagram. Thus when the spring finger 51' is in the position shown in FIGURE 3 the thermistor 33 is in circuit and when button 22 is pushed to its "On" position switch 23 will be closed and any change in the thermistor will be noted by the pointer 19. When, however, the thermistor 33, i.e., the reel 31 and its wire 32, is removed and the jack pulled out of contact with spring finger 51', the thermistor 33 will not be in circuit and then, of course, the calibration if necessary, can be made as previously described. Obviously, the spring finger 51' and contact finger 52' are insulated one from the other by utilizing the insulation strips 55, as shown. Further, the bracket 56 forms part of the circuit when the jack and reel is in position shown in FIGURE 3, of the drawings. It should also be noted that the wire 32 on the reel has markings 57 as shown more particularly in FIGURE 1 of the drawings, and these markings are spaced one foot apart so that the depth of the probe can be readily ascertained and the object, of course, is to lead the fishing line down to a corresponding depth for the desired fish.

In practical use therefore, the fisherman first removes the cover 13, pulls the reel 31 off of the device and moves the button 22 to its "On" position. This puts the meter in circuit with the batteries and the pointer 19 should move immediately to the reference calibration mark 42. If it does not, the variable resistor 40 by means of the screw driver is adjusted until the needle does point to the reference mark 42. Now the device is properly calibrated so that any change in the resistance of the probe 33 when the probe is put in circuit will be accurately measured and translated in terms of degrees Fahrenheit. The fisherman then places the reel back in its proper position and the jack contacts the spring finger 51' and depresses the same, thus breaking the contact with 52' and placing the thermistor 33 in circuit through stem 37, fitting 27, bracket 56 and end 36 through spring finger 51'. The probe 33 is then lowered into the water, and when the switch 23 is in the "On" position the temperature of the water will be rapidly indicated by the pointer 19 on the dial face 17, and the depth of the probe can be quickly and readily ascertained by markings on the wire 32. When the desired temperature of the water is reached, the button 22 is switched off, the probe is retracted and the fishing line and its bait is lowered to the proper depth for the fish desired.

To further clarify the wiring diagram of FIGURE 5, it should be obvious that wire 34 of the thermistor 33 is actually represented in practical use by the stem 37 of the jack and wire 35 is represented by the end termination 36, and from the practical appliaction when the jack is removed from the circuit contact points 53 and 54 of the wiring diagram would actually be totally removed from the circuit. The Wheatstone bridge is of the conventional type with the exception of the values given to the resistors 47, 48 and 49, and has the usual four end terminals marked 60, 61, 62 and 63. Actually the values given to the various resistors 40, 47, 48 and 49 as indicated on the drawings may not be the actual values in practical use, it only being necessary that they are known and the bridge being at a known unbalance. The ends terminals 61 and 63 are in circuit with the source of power and the variable resistor 40 and the meter with its pointer 19 is connected across the bridge to terminals 60 and 62. I also have provided a variable resistor marked 64 and this resistor is set at the factory and from then on is not further adjusted.

From the foregoing, it is believed that the features and advantages of my invention will be readily apparent to those familiar with the art, and it will of course, be understood that changes in the form, proportion and minor details of construction as well as minor details in the wiring diagram may be resorted to without departing from the spirit of the invention or the scope of the appended claim.

We claim:

An instrument for indicating and measuring temperature of water, at known depths, comprising a base member carrying a Wheatstone bridge circuit and a voltage source therefor, a meter in said bridge circuit, said meter having a dial calibrated in degrees and an indicator needle to enable visual detection of temperature, a reel rotatably mounted on said base member, said reel having a conductive hub, said reel and hub being mounted on said base for movement axially of said hub, a thermistor connected to a pair of conductors comprising a cable, said thermistor and conductors in series with said hub, said Wheatstone bridge circuit having a spring terminal switch operable by said axial movement of said reel hub, said spring terminal switch having two positions, one position connecting said thermistor, conductors, and hub as an arm of said bridge circuit, and the other position placing a resistor of known value in said arm to allow calibration of said meter, means for calibrating said meter, said cable wound around said reel, said thermistor connected to the end of said cable furthest from said hub, said cable being visually marked for indicating depth of said thermistor probe.

References Cited in the file of this patent

UNITED STATES PATENTS

| | | |
|---|---|---|
| 2,514,437 | Bailhe | July 11, 1950 |
| 2,580,320 | Quist | Dec. 25, 1951 |
| 2,617,780 | Bruyne | Oct. 7, 1952 |
| 2,685,742 | Johnson | Aug. 10, 1954 |
| 2,741,126 | Anderson | Apr. 10, 1956 |
| 2,749,753 | Adams | June 12, 1956 |
| 2,753,714 | Perkins | July 10, 1956 |
| 2,764,892 | Rosenthal | Oct. 2, 1956 |
| 2,821,579 | Benjamin | Jan. 28, 1958 |